United States Patent Office 3,341,898
Patented Sept. 19, 1967

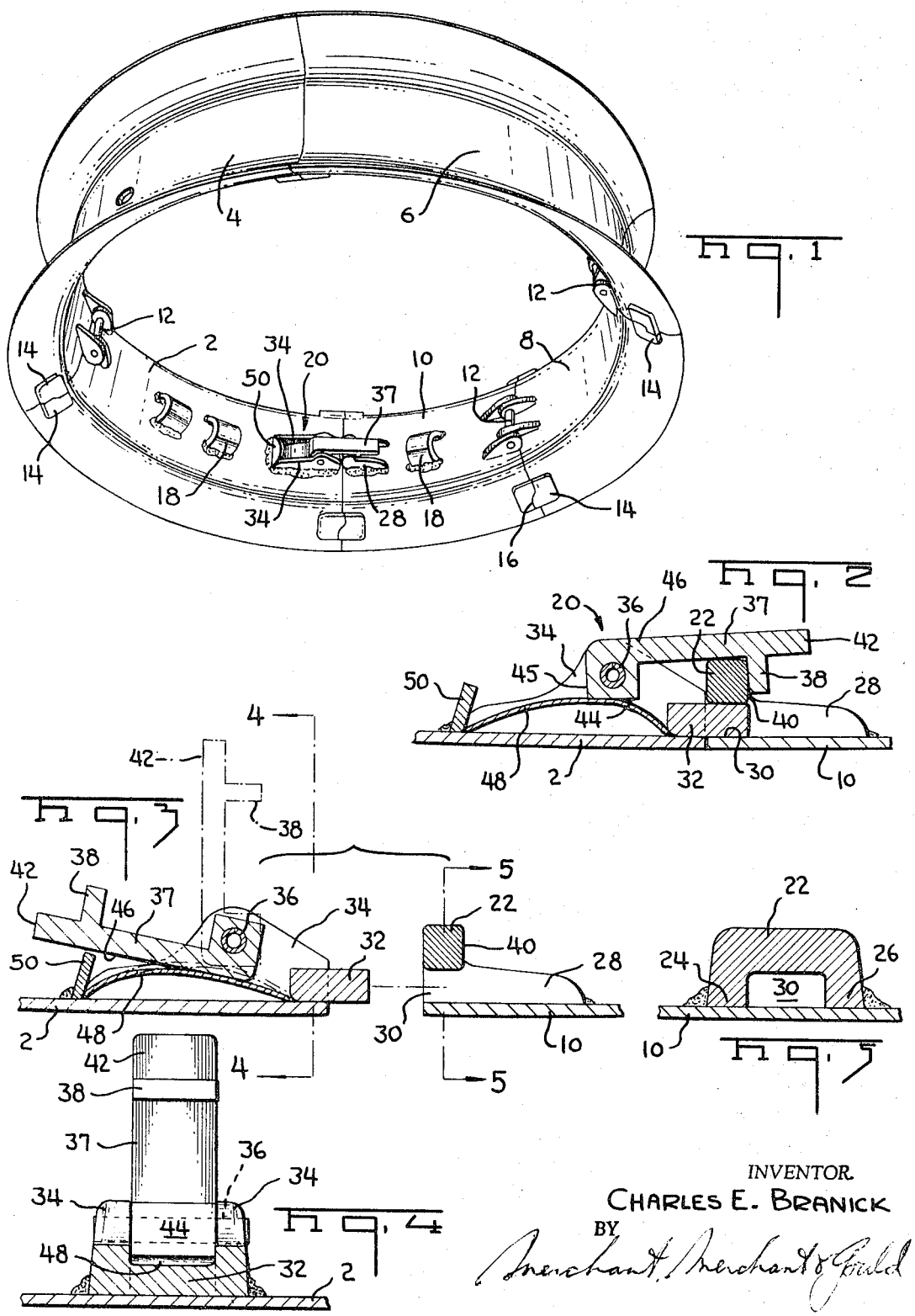

3,341,898
LATCH AND JOINT CONSTRUCTION FOR A CURING RIM
Charles E. Branick, P.O. Box 1937, Fargo, N. Dak. 58103
Filed Aug. 24, 1965, Ser. No. 482,209
4 Claims. (Cl. 18—43)

This invention relates to a latch and joint construction for a curing rim.

Curing rims of the type to which this invention pertains are well known and consist of a plurality of transversely curved metallic sections each of which is longitudinally arcuate and hinged together at their ends except at one point where these sections are latched and interconnected together to circumferentially support same against relative movement. In use, however, the unlatched hinged rim sections are collapsed by folding same about their hinged ends. In this form the collapsed rim is inserted in position in a tire casing and then expanded to receive the tire beads as usual and air bag for the curing operation. The sections which are not hinged together meet at a joint which must be held closed and prevented from collapsing inwardly and laterally.

Latches which have heretofore been in use have failed to prevent these hinged rim sections from spreading under the great force applied thereto, thereby allowing the air bag to enter between the separated sections so as to be pinched therebetween.

It is an object of this invention to provide means for latching the structure and for preventing the latched sections which meet at the joint from spreading apart.

It is a further object of this invention to provide a joint which will not collapse inwardly and laterally under the forces applied thereto in use which are considerable and which have thus provided constant trouble.

It is yet another object of this invention to provide a latching and supporting structure in a unitary device which will prevent the sections of the joint from separating and/or collapsing inwardly and laterally and which may be easily operated.

Other objects of the invention will be manifest upon reading the following description in conjunction with the accompanying drawings wherein:

FIG. 1 shows a curing rim with the latch and support of this invention in position;

FIG. 2 is a longitudinal section through the supporting latch when the rim sections are secured together;

FIG. 3 shows the rim sections of FIG. 2 separated with the cooperating latching and supporting elements of each section;

FIG. 4 is a section along the line 4—4 of FIG. 3; and

FIG. 5 is a section along the line 5—5 of FIG. 3.

In FIG. 1 is shown a collapsible tire retreading rim comprising a plurality of sections 2, 4, 6, 8, 10 which are pivoted on each other by hinges 12 so as to fold inwardly upon each other in normal fashion. A plurality of cooperating lug sections 14 are welded to each rim section and meet along a generally S-shaped line 16 to overlie the adjacent rim to locate and provide lateral rigidly to the adjacent hinged section. Other lugs 18 are secured to inner latching rim sections for engagement by a rim expanding tool (not shown) which is generally used to expand the rim and to align the latching end rim sections 2, 10. The cooperating and opposing latch and support structure of this invention is indicated generally at 20 in FIG. 1 and is for the purpose of locking and securing the sections 2 and 10 in end to end abutting relationship and to provide support for the sections against inward collapse and lateral movement.

The latch is shown in detail in FIGS. 2–5 and comprises as one essential part a U-shaped bar 22, having its laterally spaced legs 24, 26 each provided with a longitudinal extension 28 welded to rim section 10 to reinforce the bar 22 and to provide a longitudinal opening 30 under the bar 22 and between the bar and rim for a rigid rim section supporting tongue now to be described. The rigid tongue 32 has its inner end portion welded to rim section 2 and projects outwardly therefrom and is of a cross section substantially that of opening 30 throughout its length so as to closely fit therein. Supporting tabs 34 like the longitudinal extensions 28 are welded to the other rim section 2 and thus fixedly support a trunnion 36 for pivotally mounting a latching lever 37 therebetween. The lever 37 is provided with a shoulder 38 adjacent its free end for engagement with and over the top squared surface 40 of the U-shaped bar 22 when in latching engagement therewith. The end portion 42 of the lever 37 serves as a handle for quickly manipulating the lever into and out of latching position in use. To this end the lever 37 is formed with right angularly disposed, flat camming surfaces 44, 45 and 46 for a purpose now to be described. An upwardly arched spring leaf 48 in the form of a piece of thin flat spring steel material and of a length greater than the distance between the welded end of tongue 32 and an inner spaced abutment 50 on the section 2 is thus held in an upwardly curved form as is illustrated between the tongue and abutment. The spring 48 is of such length that it forcibly engages the surface 44 to urge and hold the lever into locking position as illustrated in FIG. 2. Upon swinging the lever 37 on its trunnion 36 through the dotted line position of FIG. 3 the spring 48 will be caused to finally bear forcibly against the flat camming surface 46 and urge the lever into contact with abutment 50, as is illustrated in full lines in FIG. 3.

In use, the sections 2 and 10 may be separated by forcible engagement of an expanding tool (not shown) with lugs 18. This will allow the entrance of tongue 32 in the keeper-like opening 30 provided by the legs 24 and 26 and top squared surface of the U-shaped bar 22 when the expanding force of the tool is released. The lever 37 may then be engaged by the finger of an operator and flipped from the position shown in FIG. 3, to the position illustrated in FIG. 2 to contact the shoulder 38 with surface 40 to lock the rim sections against separation.

I claim:

1. A curing rim latch for securing the adjacent free end sections of the curing rim together comprising a U-shaped bar on one rim section, means securing each leg of the U-shaped bar to said rim section adjacent an end edge of said one rim section to thereby form an opening between the U-shaped bar and said rim section, a tongue secured to the other rim section and extending therebeyond to overlap the end edge portion of the other rim section and being of a cross section substantially equal to said opening to fit therein, a lever pivotally carried by said other rim rearwardly of said tongue, a depending shoulder on said lever adjacent the free end thereof for engagement over said U-shaped bar and tongue, and having means for pivoting and holding the lever into engagement with the bar with the free ends of said rim sections in engagement.

2. A device as defined in claim 1, wherein said means for pivoting and holding the lever comprises a curved elongated spring plate bowed between its end in contact with the lever, and spaced abutment means secured to said other rim section for engagement with the ends of the spring and holding it in bowed condition.

3. A device as defined in claim 2, wherein said abutment means comprises said tongue and a stop member also fixedly secured to the rim section at points spaced less than the length of said spring plate.

4. A device as defined in claim 3 wherein the lever is provided with a pair of parallel camming surfaces on opposite sides of the pivot whereby the lever is biased by said spring plate toward and held in contact with the bar when one cam surface and spring are in engagement and is pivoted away from contact with the bar when the other cam surface and spring are in engagement.

References Cited

UNITED STATES PATENTS

| | | | |
|---|---|---|---|
| 2,981,977 | 5/1961 | Fanner | 18—43 |
| 2,985,917 | 5/1961 | Sunday | 18—43 |
| 3,167,818 | 2/1965 | Ross | 18—43 |
| 3,227,251 | 1/1966 | Ross | 18—43 X |

FOREIGN PATENTS

| | | |
|---|---|---|
| 37,678 | 3/1962 | Japan. |

J. SPENCER OVERHOLSER, *Primary Examiner.*

J. HOWARD FLINT, JR., *Examiner.*